Sept. 12, 1967  R. B. POWER  3,340,763
ANGULAR MEASURING DEVICE FOR LIGHT BEAMS
Filed Aug. 9, 1962
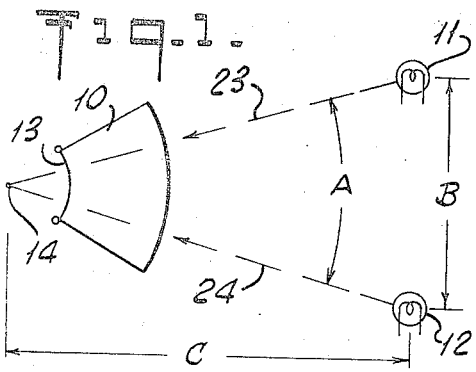
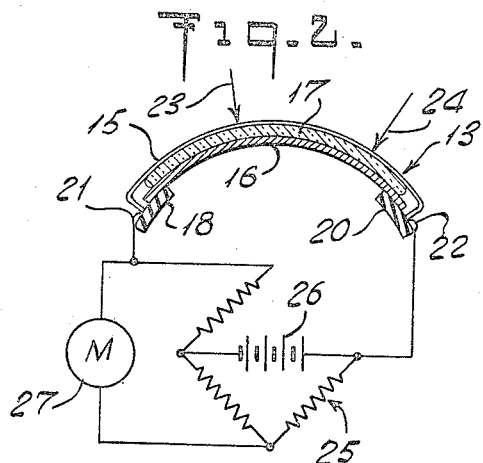
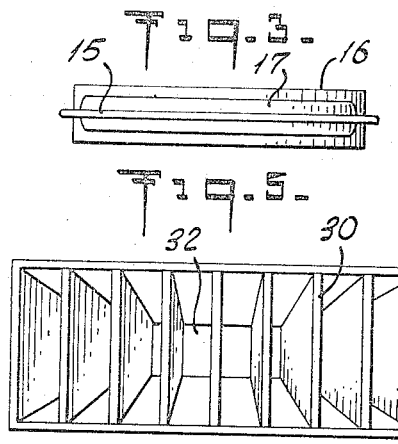
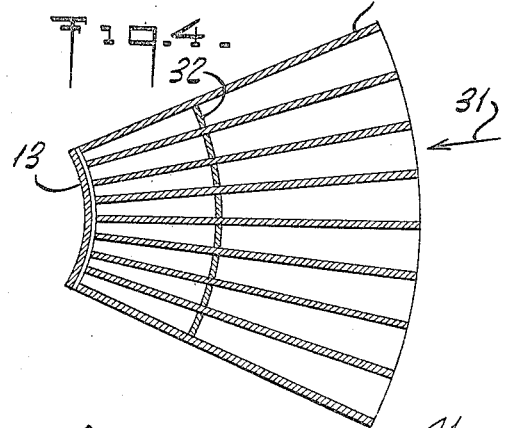
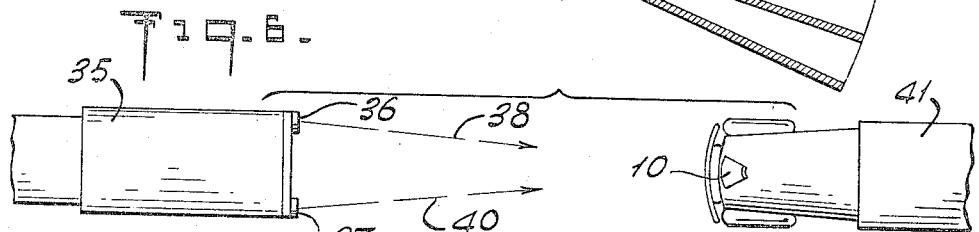
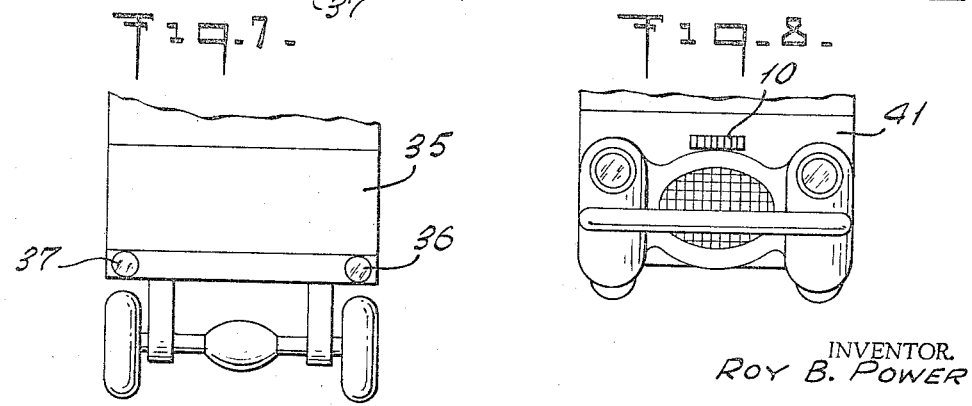
INVENTOR.
ROY B. POWER
BY
Eyre, Mann & Lucas
ATTORNEYS

United States Patent Office 3,340,763
Patented Sept. 12, 1967

3,340,763
ANGULAR MEASURING DEVICE FOR LIGHT BEAMS
Roy B. Power, Madison, N.J., assignor to Wagner Electric Corporation, a corporation of Delaware
Filed Aug. 9, 1962, Ser. No. 215,867
1 Claim. (Cl. 88—1)

This invention relates to an angular measuring device which produces an immediate indication of the angle between two light beams incident at an observation point. The invention has particular reference to a means for measuring angles and distances associated with light sources carried by movable vehicles.

The measurement of the bearing or angular range between two incident light beams can be measured accurately by means of a pelorus. This device must be directed first toward one light source and its bearing noted in relationship to some base direction such as a north and south line. Then the pelorus is directed toward the second light source and a second reading taken. The difference between these two readings is the angular range and if the distances between the two light sources are known, the distance from the observer to the light sources can be calculated.

The above described angle measuring device and other similar types consume a definite time interval before all the readings can be taken and the result is subject to errors because, in many instances, the base direction is not known accurately and if the vehicle is moving fast, the measurements are inaccurate because of a change of position during the time interval between observations. The present invention eliminates all these difficulties and automatically senses the angular range of the two light beams at the same instant. Also, a reading on an electrical meter is provided at the same time. The meter may be calibrated in angles or, in some special cases where the distance between the two sources is known in advance, the meter may be calibrated in distance units.

One of the objects of this invention is to provide an improved angular measuring device for light beams which avoids one or more of the disadvantages and limitations of prior art devices.

Another object of the invention is to measure the angular deviation of two sources of illumination as seen by an observer without the observer making any sighting observations.

Another object of the invention is to convert the deviation measure into an electric current so that the range angle may be read from a calibrated electric meter.

Another object of the invention is to eliminate high voltage power supplies and the need for amplifiers from the measuring device.

Another object of the invention is to measure the distance from an observer to the source of the light beams by the angular deviation between the beams when the distance between the sources is known.

The invention comprises an angular measuring device for light beams and comprises a plurality of hollow tubes for conveying light from two sources through the tubes to the exit ends. All the tubes are disposed in an angular array for accepting all the light beams directed from a predetermined area. A light sensing device at the exit end includes a first electrode comprising a resistance wire, a second electrode comprising a conductive base, and a layer of photoconductive material positioned between the two electrodes. This sensing device is positioned at the exit end of the angular array of tubes to intercept any beam passing through the tubes. The light received by the sensing device permits current to flow between the two electrodes at the points of incidence of the light. A measuring circuit measures the current through the sensing device and indicates an angular deviation.

For a better understanding of the present invention, together with other and further objects thereof, reference is made to the following description taken in connection with the accompanying drawings.

FIG. 1 is a diagrammatic plan view showing the measuring device and two light sources.

FIG. 2 is a cross sectional view of the sensing device connected as one arm of a Wheatstone bridge.

FIG. 3 is an end view of the sensing device showing the two electrodes and the photoconductive material.

FIG. 4 is a cross sectional view of the measuring device showing the transmission tubes, each with a light filter, and the sensing device positioned at exit ends of the tubes.

FIG. 5 is an end view of the measuring device showing the entrance ends of the tubes.

FIG. 6 is a plan view showing two vehicles and illustrating how the measuring device may be used between vehicles to give an instant reading of the intervening distance.

FIG. 7 is an end view showing the rear end of a truck and the position of two light sources set at a known distance.

FIG. 8 is the front view of a truck showing where the measuring device is positioned for such an application.

Referring now to the figures, the diagram shown in FIG. 1 shows the relative positions of the measuring device 10 and the two lamp sources 11 and 12. The sensing device 13 is positioned at the exit end of the measuring device and determines the position of the two light beams from sources 11 and 12. It is obvious from this diagram that the following relations exist:

$$\tan \frac{A}{2} = \frac{B}{2C} \text{ and } C = \frac{B}{2 \tan \frac{A}{2}}$$

Where A is is angle between the two beams, B is the separation between the two light sources, and C is the distance from the light sources to an observation point 14.

The cross sectional drawing and circuit diagram shown in FIG. 2 illustrate the details of the sensing device 13. The device comprises a resistance wire 15, which serves as one electrode, a conductive base 16, which serves as the other electrode, and a thin layer of photoconductive material 17 positioned between the electrodes. Insulating bases 18 and 20 may be provided for terminals 21 and 22 to which the ends of the resistance wire 15 are secured. One method of measuring the position of the two beams 23 and 24 is to connect terminals 21, 22 as one of the arms of a four-armed Wheatstone bridge 25 having opposite junction points connected to a source of potential 26 and the other two junction points connected to a meter 27. The bridge can be arranged so that the three resistors in the bridge have the same resistance as the resistance wire 15, then, when there is no light incident on the sensing device, the meter will read zero. Now let it be assumed that beams 23 and 24 are incident upon the photoconductive material 17 at the points illustrated in the figure. The light will cause conduction between the wire 15 and the conductive base 16. Under these conditions current travels from terminal 21 over a portion of the wire 15 until it reaches the incident point of beam 23. Then the current flows directly to the base 16 because the photoconductive material 17 provides a low resistance path between the two electrodes. The current now traverses a portion of base 16 until it reaches the point below beam 24. At this point the current again moves through the photoconductive material to the resistance wire 15 and then to terminal 22 and the other side of the battery 26. In this manner the two light beams 23 and 24 provide a short circuiting path between the two terminals and the amount of resistance remaining in the circuit is a measure of the relative positions of the two light beams.

In order to align the light beams, a series of tubes 30 are employed. These are illustrated in FIGS. 4 and 5. The tubes may be made of metal or any other opaque material. The tubes are arranged in an angular array so that a light beam coming from a distant source, such as indicated by the arrow 31, enters one and only one tube and shines only on that portion of the sensing device 13 which is placed in front of the exit portion of the same tube.

There may be times when it is desired to use light having a particular wave length and, if this is the case, small filter glasses 32 may be placed in each tube. These filters are of particular importance when the desire for secrecy requires that infrared light, not visible to the human eye, be used. These filters also protect the device from erroneous signals due to ambient light not produced by the intended sources. In order to reduce the reflected light from the sides of the tubes, a non-reflecting coating may be placed on the inside surfaces of all the tubes. A series of diaphragms may also be used. The non-reflecting coating insures that only light shining directly from the lamps will affect the sensing device.

In FIGS. 1 and 4 the sensing device 13 is shown mounted directly behind the tube array at the exit ends. While this is the obvious place for the sensing device, it may be more convenient to mount the device at some other, more protected location. This may be done if a series of light-conveying rods connect the exit ends to the sensing device. This means of conveying light beams between two points is well known and need not be described here in detail.

FIGS. 6, 7 and 8 illustrate one application of the angular measuring device. A first truck 35 is equipped with two light sources 36 and 37, each designed to transmit infrared light only. These lamps produce beams 38 and 40 which travel to the rear and are incident on the front portion of a following truck 41. This truck is equipped with the measuring device 10 as described above. Since the distance between the lamps 36 and 37 is known and is kept constant the meter 27, which can be mounted on the instrument panel in front of the driver, may be calibrated in feet representing the distance between the two trucks. This means that a series of vehicles may travel at night without head lights or other visible illuminating means, but the distance between each adjacent vehicle is indicated by an electric meter or other indicating means to the driver. It should be pointed out that the distance indicator operates without any time delay and gives a continuous reading without any interruption. When the series of trucks is negotiating a turn, the light beams will enter different tubes but if the distance between trucks is the same the reading will remain constant.

The foregoing disclosure and drawings are merely illustrative of the principles of this invention and are not to be interpreted in a limiting sense. The only limitations are to be determined from the scope of the appended claim.

I claim:

A distance measuring device for determining the approximate distance between two movable vehicles comprising: two lamps mounted on a first vehicle for forming two light beams directed convergently toward a second vehicle; an angular measuring device mounted on the second vehicle for determining the angle subtended between the two beams; said angular measuring device including a plurality of hollow tubes disposed in a divergent angular array for conveying light through each tube to an exit end area common to all said tubes, a non-reflective coating on the entire inner surface of each tube for passing light rays to the exit end thereof only when the rays are directed through the tube in a direction parallel to the tube axis; a light sensing device which includes a first electrode comprising a resistance wire, a second electrode comprising a conductive base, and a layer of photoconductive material positioned between said electrodes; said resistance wire being narrowest in width and said photoconductive material being intermediate in width and said conductive base being greatest in width, said sensing device being positioned at the common exit end area of said angular array in such manner that said resistance wire, photoconductive material and conductive base all extend completely across the ends of said hollow tubes at said common exit end area and at least a portion of the width of each of said resistance wire, photoconductive material and conductive base is exposed to direct impingement of light passing through any one of said tubes, whereby passage of light through any portion or all of the exit end cross-section of any one of said tubes is detected by a correlated short circuit path between said resistance wire and said conductive base without light having to pass through said resistance wire; and a measuring circuit including a source of electric power and a distance indicating means, said measuring circuit connected in series with said resistance wire.

References Cited

UNITED STATES PATENTS

| | | | |
|---|---|---|---|
| 1,458,165 | 6/1923 | Coblentz | 250—83 X |
| 1,514,123 | 11/1924 | Bacevicz | 250—211.2 X |
| 1,789,230 | 1/1931 | Heaton | 250—237 X |
| 2,231,170 | 2/1941 | Lindenblad | 250—83.3 |
| 2,550,610 | 4/1951 | Smith et al. | 250—237 X |
| 2,738,753 | 3/1956 | Eubank | 88—1 X |
| 2,774,961 | 12/1956 | Orlando | 88—1 X |
| 2,896,089 | 7/1959 | Wesch | 250—214 |
| 3,036,256 | 5/1962 | Purdy | 250—237 |
| 3,087,069 | 4/1963 | Moncrieff-Yeates | 250—211.2 |
| 3,152,317 | 10/1964 | Mayer | 88—1 X |

JEWELL H. PEDERSEN, *Primary Examiner.*

C. E. QUARTON, T. L. HUDSON, *Assistant Examiners.*